Oct. 21, 1941.    A. F. SINCLAIR ET AL    2,260,199
CYCLE CONTROLLER
Filed Oct. 4, 1939    2 Sheets-Sheet 1

INVENTORS
ARCHIBALD F. SINCLAIR
JOHN E. COLLINS
BY
Hyde, Higley & Meyer
ATTORNEYS Oct. 21, 1941.  A. F. SINCLAIR ET AL  2,260,199

CYCLE CONTROLLER

Filed Oct. 4, 1939    2 Sheets-Sheet 2

INVENTORS
ARCHIBALD F. SINCLAIR
JOHN E. COLLINS
BY
Hyde, Higley & Mayer
ATTORNEYS Patented Oct. 21, 1941

2,260,199

UNITED STATES PATENT OFFICE 2,260,199

CYCLE CONTROLLER

Archibald F. Sinclair and John E. Collins, Akron, Ohio, assignors to The Sinclair-Collins Valve Co., Akron, Ohio, a corporation of Ohio Application October 4, 1939, Serial No. 297,886

6 Claims. (Cl. 74—97)

This invention relates to improvements in time-cycle controllers of the type used to control repetitive processes.

One of the objects of the present invention is to provide improved control mechanism for a control member wherein cams are utilized in such a way as to provide snap action for movement of the control member in both on and off directions.

Another object of the present invention is to provide novel mechanism for controlling a member by means of the relative movement between two cam controlled levers.

Another object of the invention is to provide an improved arrangement of adjustable cams combined with coacting followers and control mechanism for producing variable cycle control.

Other objects and advantages of the present invention and suitable structures embodying the same are disclosed in the accompanying specification and drawings and the essential features thereof are set forth in the claims.

Figure 3:
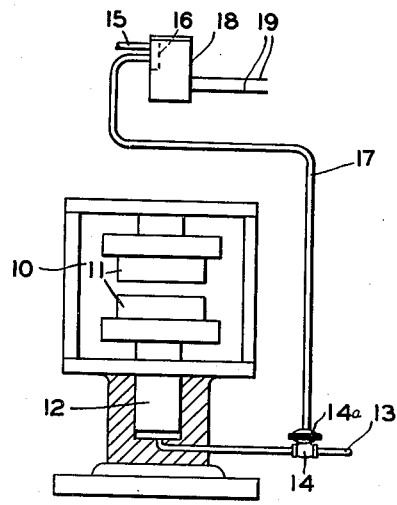
Figure 1:
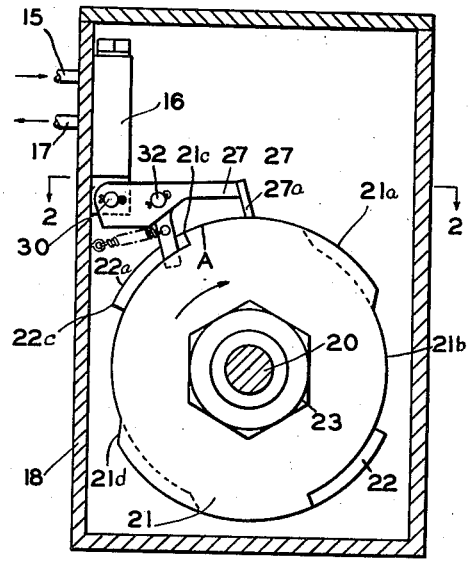
Figure 2:
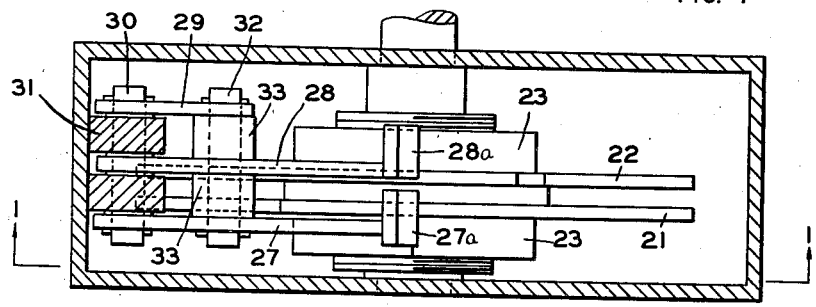
Figure 4:
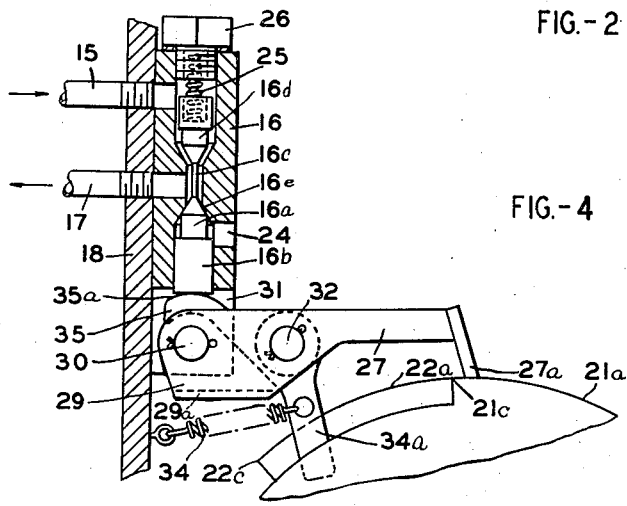
Figure 5:
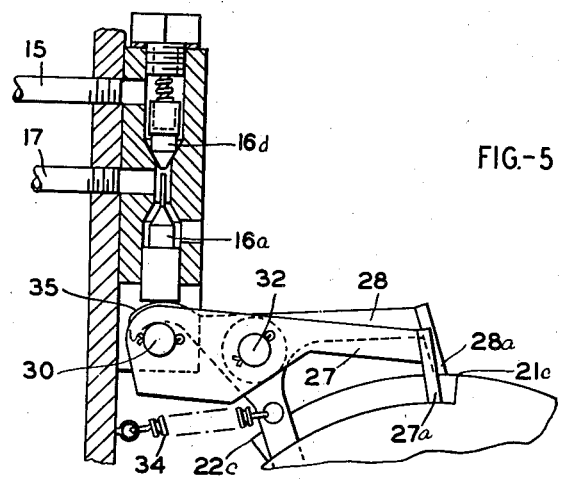
Figure 6:
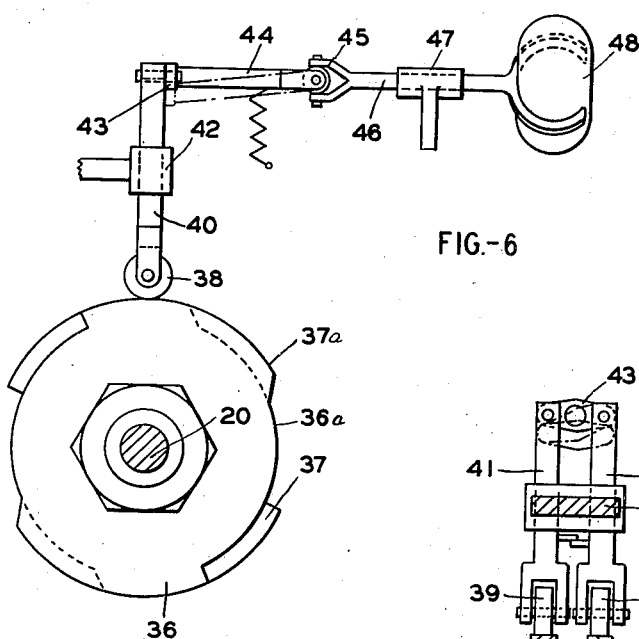
Figure 7:
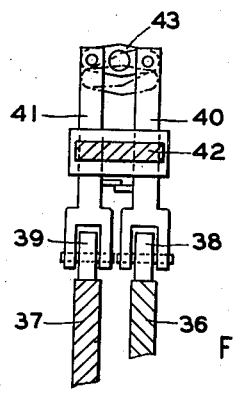
Figure 8:
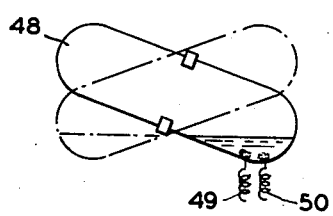

In the drawings, Fig. 1 is a sectional elevational view on the line 1—1, Fig. 2, illustrating one form of our improved control mechanism; Fig. 2 is a sectional plan view taken on approximately the line 2—2 of Fig. 1; Fig. 3 is a diagrammatic arrangement of our improved control as applied to a press; Fig. 4 is an enlarged and somewhat diagrammatic view of a portion of the mechanism of Fig. 2; Fig. 5 is a similar view showing another position of the parts; Fig. 6 is a side elevational view showing a modified form of mechanism; while Figs. 7 and 8 are end views of parts shown in Fig. 6, Fig. 7 being a view from the left and Fig. 8 from the right, in Fig. 6.

Our improved cycle controller is adapted for use in many industries, but for convenience and in no sense of limitation we have illustrated but one use thereof. The drawings illustrate in Fig. 3 use of the device in connection with a press 10, such as is used in the rubber, plastic or other industries where material is placed between platens or dies 11 which are squeezed together by a fluid pressure, such as a hydraulic, ram 12 supplied with pressure fluid through conduit 13 and controlled by one or more diaphragm valves 14. Each diaphragm valve is controlled from a pressure fluid supply 15, generally of compressed air, which passes through a pilot valve 16 and then through conduit 17 to the diaphragm of the valve operating servo motor 14a. The cycle controller is housed in a casing 18 and the cams of the controller are rotated by a small electric motor (not shown) which is supplied from the lines 19.

One embodiment of our improved controller is shown in Figs. 1–5, which include the casing 18, the air pilot valve 16 with its connecting conduits 15 and 17 as previously described, and their controlling and operating parts. Shaft 20, which is the cam shaft previously referred to, is rotated by any power source, such as a small electric motor (not shown). The shaft 20 may carry any number, even 6, 8 or more of cams or sets of cams, depending upon the number of devices to be controlled and the number of operations of each during a complete cycle of operations of the machine. For example, one cam may control press closing movement, another a mechanism for locking the press closed, another for applying low pressure to the platens, still another for applying high pressure, and so on. Each of these devices or steps in the cycle is individually controlled by some governing or pilot device (here typically illustrated as a valve) operated by one of the said cams or cam sets.

Our invention provides novel means for utilizing the cams on this shaft for controlling the pilot valves or devices 16. It will be understood that an electrical switch or other control member may take the place of the valve 16, as our improved control mechanism may be used with various types of control members.

In using cams and followers it is well known that a sudden action may be produced when the follower drops off from a sharp shoulder of a cam travelling in one direction, but when it is desired to later raise the follower to a higher portion of the cam a sharp shoulder cannot be used but some sort of graduated lifting cam surface is necessary. Thus it has been possible to produce "snap" action where the follower drops, but impossible where the follower rises. If drop of the follower opens the valve it will open with snap action and close with graduated action, and vice versa. One of the advantages of the present invention is that a snap action may be produced when moving the control member in both directions, i. e., both to its on and to its off position. In the device here shown, each follower is operated by the two cams of a set, or, to put it in another way, the cam for each follower is made in two parts, each of which we will here refer to as a cam. The two cams 21, 22, are rigidly, but detachably and adjustably, secured to shaft 20, as by the clamping nuts 23, and by varying the position of the cams around the shaft axis relative to each other, or of either to the shaft, changes in the control cycle may be produced. While the two cam parts could be formed as a single composite cam, we prefer the type here shown, where the two cams are in the form of plates mounted side by side on the cam shaft with each plate controlling its own follower. For simplicity of illustration, cams 21 and 22 are identical, but it will be understood that other types of cam may be used.

Referring the cam 21, it will be noted that it has the radially raised portions 21a and the radially depressed portions 21b; also that the cam travel is in the direction of the arrow, Fig. 1, and that a sharp shoulder is provided at 21c and a graduated surface at 21d for purposes later described.

The control or pilot member here shown is a combined inlet and exhaust valve for controlling air flowing by way of conduit 15 to the diaphragm valve control conduit 17, as previously mentioned. Through the valve casing is formed an exhaust port 24. The exhaust valve 16a is carried on a valve stem 16b extending out through the bottom of the valve casing. A nose 16c on the upper end of the exhaust valve is adapted to engage and lift the separate inlet valve 16d which is normally biased to closed position by a compression spring 25 held in place by the cap 26. It will be noted that the exhaust valve 16a has a definite limiting position when against its seat 16e with the valve stem 16b in its uppermost position so as to admit air through the inlet valve to pipe 17.

The operative connections between the cams 21 and 22 and the movable valve parts include levers 27 and 28. Lever 27 has a U-shaped body provided with a bottom portion 29a and side cheeks 29 which straddle bracket members 31 depending from the valve casing, in which members the lever is pivoted on a pin 30. The valve casing 16 is rigidly mounted in any suitable manner on the casing 18. A fulcrum connection is provided between levers 27 and 28 by a pin 32 which is mounted in the two cheeks 29, suitable spacers 33 being provided to hold lever 28 in proper position relative to lever 27. Levers 27 and 28 have follower arm portions 27a and 28a, respectively, engaging and riding upon the cams 21 and 22, respectively. A tension spring 34 connected to a depending arm 34a on lever 28 maintains both followers in engagement with their cams and biases both levers 27 and 28 to move in a clockwise direction as viewed in Figs. 4 and 5. At its inner end lever 28 has an arm portion 35, the surface 35a of which lies beneath valve stem 16b and is arcuate about the pin 30.

The construction described operates as follows:

Let us assume that the cycle of operations of the press shown in Fig. 3 is under way and that the particular device, such as a servomotor 14a controlled by the cams or cam seat shown, has been energized, and that the parts are in the positions shown in Figs. 1 and 4. The two followers 27a, 28a are in their elevated positions, riding upon the elevated portions 21a, 22a of the two cams. The valve mechanism is in its elevated position, with the exhaust valve closed and the inlet valve open, so that pressure is being supplied to the servomotor 14a. The two followers are held against their cam surfaces by the single spring 34. In this position of the parts motion of the two cam followers together produces no motion of the valve parts, because the two arms 27, 28, when they move together, pivot about the pin 30 and the arm 35 has its surface 35a curved about the axis of pin 30. So that when the two followers 27a, 28a are at the same level, whether they be both elevated or both depressed, the valve mechanism is in the on position.

Let us now assume that as the cams rotate in the clockwise direction, Fig. 1, follower 27a reaches and drops off from a sharp shoulder 21c of its cam, the follower 28a, however, being retained in its elevated position by continuation of its elevated cam part 22a, so that the parts reach the position shown in Fig. 5. Dropping of arm 27 has the effect of permitting the valve parts to move to their off position, as shown in Fig. 5, with the inlet valve closed and the exhaust valve open, because as follower 27a drops, the lever 27 carries the pivot pin 32 downwardly, turning arm 28 in a counter-clockwise direction, Fig. 1, about a pivotal axis at the point where the follower 28a rides upon the cam 22. So that sudden drop of the follower 27a, at a sharp shoulder, such as 21c, without downward movement of follower 28a, produces snap operation of the valve parts to the off position.

Let us now assume that with the follower 27a in its lower position and follower 28a still in its upper position, as shown in Fig. 5, the follower 28a reaches and drops off from a sharp shoulder 22c of its cam 22. That motion is produced by the effect of spring 34, transmitted to lever 28 and turning it about the pivotal axis 32, while lever 27 remains stationary, and the effect upon the valve parts is to elevate them and return them to the position shown in Fig. 4.

Both followers are now in their depressed or lowermost positions, but both at the same level, and the cams are provided with a graduated portion, as at 21d, by means of which the lever 27 is gradually elevated to its uppermost position, carrying with it the lever 28 and follower 28a, without valve operation, for reasons before described, restoring the parts to their original positions, shown in Figs. 1 and 4, ready for another valve operation. During both operations of the valve, when it moves either to off position or to on position, the operation is by snap action, due to the fact that the motion is effected in each case by the spring 34 and as the result of one or the other of the followers 27a, 28a, dropping off from a sharp or abrupt shoulder.

A modified form of our device is shown in Figs. 6, 7 and 8 where cams 36 and 37 perform functions similar to those of cams 21 and 22 and are mounted on a rotatable cam shaft 20 as before. The rollers 38, 39 of slide form and followers 40 and 41 engage cams 36 and 37 respectively, as shown in Fig. 7. These followers are preferably guided in a fixed bracket 42 and have their upper portions pivotally connected to opposite ends of an equalizer bar 43 mounted on one end of an oscillatable shaft 44 connected by a universal joint 45 to a shaft 46 which is oscillatably mounted in a fixed guide 47. Carried by the shaft 46 is a suitable pilot device, shown in this case as a mercoid switch 48 of the well known type comprising a glass capsule containing a small pool of mercury which upon swinging capsule motion makes or breaks an electrical connection between the conductors 49 and 50, Fig. 8. The elevated and depressed cam portions 36a, 37a are so arranged as to cause relative vertical movement between followers 38 and 39 so as to produce a tilting movement of bar 43, which in turn will cause turning movement of shafts 44 and 46 so as to tilt the mercoid switch to one or the other of its positions shown in Fig. 8 to control the electric circuit which includes the switch. Of course, here, as in the form first described, snap action may be secured in both directions. When both followers are at the same level, either up or down, the switch is in one position, say open. When one follower alone is dropped, say 38, the switch is closed.

The control mechanism is of simple form and produces snap action in both directions by the use of mechanism capable of adaptation and adjustment to any control cycle. Other advantages of the invention will be apparent to those skilled in the art.

What we claim is:

1. In a time-cycle controller, a control member, cam means having two cam tracks, a follower engaging each track, each track having a substantially radially inclined portion providing instantaneous drop of its follower as it travels along said track, and an operative connection between said followers and said member for producing actuating movement of said member by relative motion between said followers during operation thereof.

2. In a controller of the class described, a control member, rotatable cam means having two cam tracks with portions thereof spaced at radially different distances from the axis of rotation of the cam means, followers movable relative to each other during operation and engageable with said tracks and movable thereby, each track having a substantially radially inclined portion providing instantaneous drop of its follower as it travels along said track, and an operative connection between said followers and said member for causing movement of said member.

3. In a time-cycle controller, a control member, a rotatable shaft, a pair of cams having substantially radial drops thereon mounted side by side on said shaft and rotatably adjustable relative to each other, said cams having portions varying in radial position, a follower engaging each cam, and an operative connection between said followers and said member for producing actuating movement of said member by relative motion between said followers radially of said cams whereby instantaneous changes of position of said control member may be obtained.

4. In a time-cycle controller, a control member having at least two controlling positions and at least one of which is definitely limited, cam means having two cam tracks, said cam tracks having substantially radial drops thereon, a follower engaging each track, an operative connection between said followers and said member so arranged that when said followers are in predetermined relation to each other said member is held thereby in said definitely limited position, and said operative connection including means for causing movement of said member to another position by relative movement between said followers during operation thereof so as to vary said predetermined relation.

5. In a time-cycle controller, a control member, two levers, one having a fulcrum on the other, and spaced from the ends of said other lever, one of said levers having a fixed pivot, one of said levers having an operative connection with said member, and cam means for controlling the position of said levers relative to each other.

6. In a time-cycle controller, a control member, cam means having two cam tracks adjustable relative to each other, a follower engaging each track, an equalizer bar, said followers having operative connections with opposite ends of said bar, a shaft connected with said bar for oscillation by tilting of said bar, a connection between said shaft and control member for actuating the later by oscillation of said shaft, and said cam means being arranged to cause relative movement of said followers in a manner to cause tilting of said bar.

ARCHIBALD F. SINCLAIR.
JOHN E. COLLINS.